Jan. 7, 1930. L. BRADLEY ET AL 1,743,080
MANUFACTURE OF PULP AND TREATMENT OF RESIDUAL LIQUORS, ETC
Filed March 22, 1926
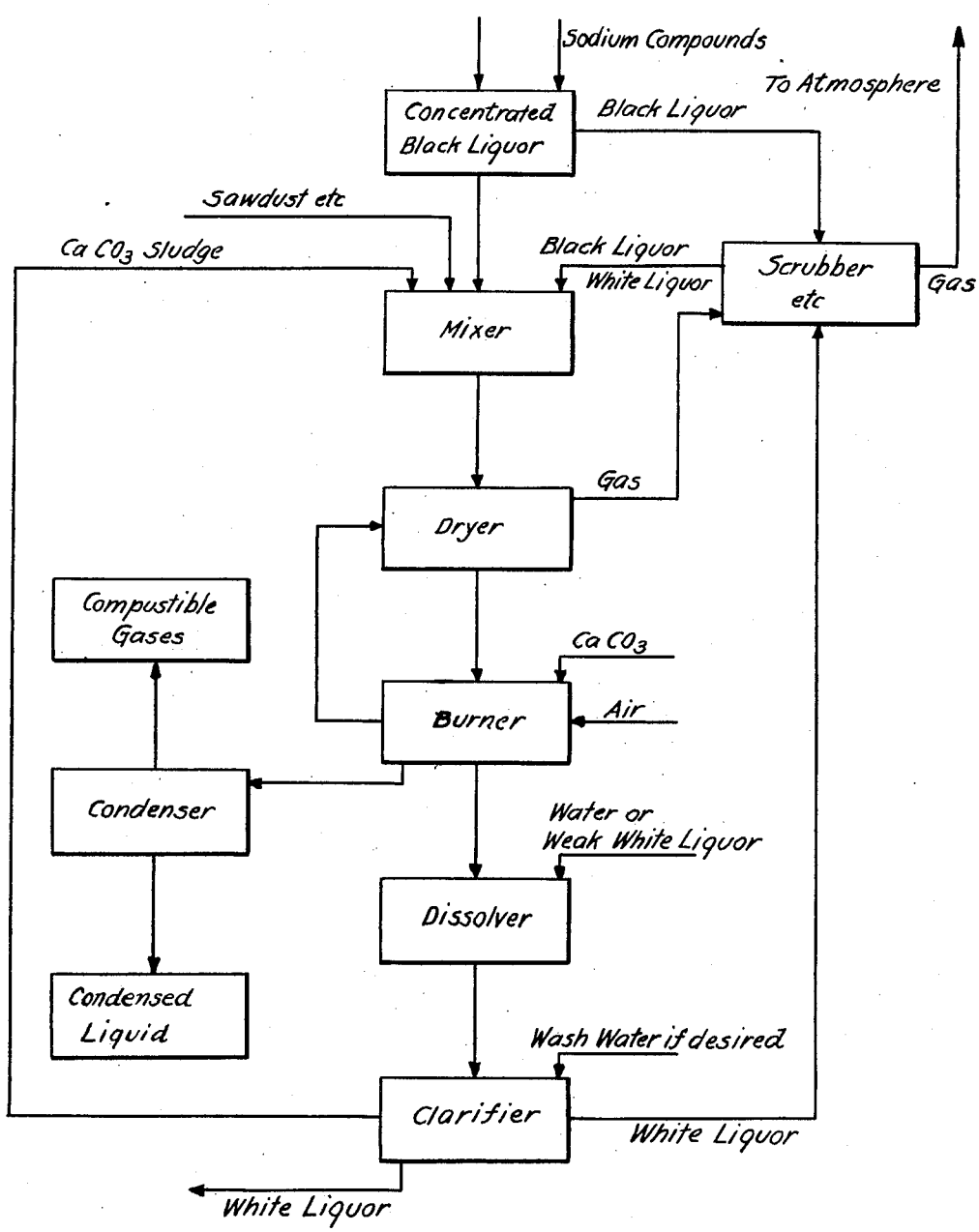
INVENTOR
Linn Bradley
Edward P. McKeefe
BY
ATTORNEYS Patented Jan. 7, 1930

1,743,080

UNITED STATES PATENT OFFICE

LINN BRADLEY, OF MONTCLAIR, NEW JERSEY, AND EDWARD P. McKEEFE, OF PLATTS-BURG, NEW YORK, ASSIGNORS TO BRADLEY-McKEEFE CORPORATION, OF NEW YORK, N. Y., A CORPORATION OF NEW YORK

MANUFACTURE OF PULP AND TREATMENT OF RESIDUAL LIQUORS, ETC.

Application filed March 22, 1926. Serial No. 96,665.

This invention relates to improvements in the treatment of residual liquors from chemical pulp making processes for cooking wood with cooking liquors containing caustic soda and reactive sodium-sulfur compounds, such as sodium-sulfid, sodium sulfite, etc.

According to the present invention, the residual liquor is admixed with calcium carbonate, either before or after final concentration, and the dry residue from the liquor with admixed calcium carbonate, is heated under reducing conditions to a temperature sufficient to convert calcium carbonate into calcium oxide; and the resulting product containing calcium oxide and sodium carbonate, together with sodium-sulfur compounds such as sulfides, is added to water and agitated therein at an elevated temperature with the resulting direct production of a liquor containing caustic soda and a reactive sodium-sulfur compound, such as sodium sulfid, etc.

In the process commonly practiced for the treatment of residual liquors, e. g. from the so-called sulfate process (using caustic soda and sodium sulfid), the liquor is concentrated and dried and subjected to a smelting operation with the resulting production of a product containing sodium carbonate and sodium sulfid which is then causticized by adding lime to form a solution containing caustic soda and sodium sulfid.

In the process of the present invention, calcium carbonate is added to the concentrated residual liquor or to the dried product before it is subjected to the furnacing operation, and the furnacing treatment is carried out under reducing conditions and at a sufficiently high temperature to convert calcium carbonate into calcium oxide, so that the resulting furnace product can be considered self-custicizing, and so that this product, when added to water and agitated therein at an elevated temperature, will give directly a custicized solution containing caustic soda and reactive sodium sulfur compounds such as sodium sulfid, sodium sulfite, etc.

The process of the present invention includes improvements in the recovery of the soda content of the residual liquor in the form of active sodium compounds in solution for refuses as cooking liquor; in the reburning of the lime mud or sludge as a part of the regenerating treatment of the residual liquor so that it can be utilized for converting sodium carbonate into sodium hydroxide; in the utilizing of the fuel value of the organic material contained in the residual liquor for the furnacing operation in which the calcium carbonate is decomposed; in the production of a cooking liquor containing caustic soda and reactive sodium-sulfur compounds in a particularly advantageous manner from the residual liquors of the pulp making process; and other improvements which will appear from the following more detailed description of the invention.

The accompanying drawing is illustrative of one manner in which the process may be carried out. However, it is to be understood that the invention is not limited to the particular arrangement of apparatus or order of steps indicated except as described in the following specification and claims.

In the process of the present invention, the treatment of the residual liquor is combined with the treatment of the lime mud or sludge resulting from a causticizing treatment, and this operation is so combined that the calcium carbonate of the lime mud is decomposed so as to form calcium oxide. This decomposition is moreover carried out under reducing conditions and with utilization of the fuel value of the organic matter of the residual liquor; while the calcium oxide produced as a product of the treatment, is utilized for the conversion of sodium carbonate which has been formed into sodium hydroxide in a novel and particularly advantageous manner, and with simultaneous production of a liquor containing reactive sodium-sulfur compounds which are produced by or contained in the product of the furnacing operation carried out under reducing conditions.

The residual liquor treated in the process of the present invention may, for example, be residual liquor from the so-called sulfate process in which the cooking liquor contains caustic soda and sodium sulfid; or it may be a residual liquor obtained by the cooking of wood with a cooking liquor containing caustic soda and a smaller amount of sodium sulfite; or it may be a residual liquor obtained from the cooking of wood with other cooking liquors containing caustic soda and also containing one or more reactive sodium-sulfur compounds. The residual liquor is separated from the pulp, at the end of the cooking operation, in any suitable manner, and the liquor is subjected to a concentrating operation to remove water therefrom and to produce ultimately a dry or substantially dry product which contains for the most part or fully, the carbonaceous matter of the residual liquor.

The calcium carbonate or lime mud, which may advantageously be that from the subsequent causticizing step of the process, together with additional calcium carbonate if necessary to make up for losses or replacements, is added to the residual liquor after partial or complete concentration, and the resulting concentrated and dried or substantially dried product with admixed calcium carbonate, is subjected to treatment under controlled conditions as to temperature, etc., and under reducing conditions, to convert the calcium carbonate to a large extent or completely, into calcium oxide, the temperature being equal to or somewhat above that required to decompose calcium carbonate. As a result of this treatment, a product is obtained containing the calcium oxide produced from the calcium carbonate and also containing the other products formed by the heating operation under reducing conditions, the product containing sulfur compounds, such as sulfid. The treatment, although under reducing conditions, makes use of the fuel value of the carbonaceous material produced from the residual liquor, with the resulting production of gases which may contain a considerable amount of carbon monoxide and which may be of value and utilizable for fuel purposes.

The product produced by the reduction treatment, and containing calcium oxide, is added to and mixed with a suitable amount of water, and subjected to agitation at an elevated temperature. The furnace product can advantageously be added directly to water so that the heat contained in the furnace product is utilized for heating the water and for promoting the dissolving of valuable compounds and such reactions as take place. Owing to the self-causticizing character of the furnace product, the sodium carbonate will be in whole or in part, converted into caustic soda by the lime which the furnace product contains. The sulfur containing compounds of the furnace product will be dissolved or will react to give a solution containing reactive sodium-sulfur compounds, so that a composite liquor will be directly produced containing both caustic soda and such reactive sodium-sulfur compounds. If the amount of lime produced from calcium carbonate during the process is insufficient for the desired or for complete causticizing, additional lime can be added for that purpose, but where sufficient lime is formed during the process, additional lime is not necessary. The mixture of water and of furnace products is heated if necessary and is subjected to agitation to promote such reactions as that of converting sodium carbonate into sodium hydroxide, etc., so that there is produced directly, or after subsequent modification, a cooking liquor suitable for use in the further carrying out of the same or a different pulp making process. The calcium carbonate sludge formed by the reaction of the lime on the sodium carbonate, together with any other insoluble constituents which may be present in the furnace product, is separated from the liquor, and the liquor, e. g. if too strong for use direct, may be adjusted as to strength or composition or both, before use as a cooking liquor.

The calcium carbonate sludge may be returned to the process and added to further amounts of residual liquor or to concentrated residual liquor in the further carrying out of the residual liquor treatment, so that this calcium carbonate will be reburned in a similar manner to that above described during the carrying out of the reducing furnace treatment. When the calcium carbonate sludge, after repeated use, becomes contaminated or unsuitable, it may be well washed to regain the soda admixed therewith, and the washed lime mud then discarded or otherwise used and a fresh amount of calcium hydroxide or calcium carbonate added to the cycle to maintain a sufficient amount of lime in the cycle for the causticizing operation.

Loss of soda and of sulfur compounds can be supplied by adding, for example, sodium carbonate or caustic soda or sodium sulfate at a suitable point in the cycle. Sodium sulfate, for example, should be added to the residual liquor at some point prior to the reducing treatment; while sodium carbonate may be added to the solution obtained from the furnace product so that it will be causticized by the lime contained therein. Soda and sulfur compounds contained in the stack gases are advantageously recovered, for example, by scrubbing the gases with a suitable liquor. Some of the alkaline residual liquors may be used for this purpose, to scrub the gases given off during the drying, or during the subsequent furnacing operation, and the recovered compounds can thus be returned to the cycle of operations, for example, after the liquor has been used a sufficient time as a scrubbing liquor, and after it has been increased in soda or in sulfur compounds or in both as a result of such scrubbing operations.

When the calcium carbonate sludge is mixed with strong residual liquors, the mixture may be subjected to a drying operation and the dried mixture will then contain a soda compound and also the calcium carbonate, intimately admixed with each other. Instead of adding all of the calcium carbonate sludge to the strong residual liquor, a part only of the lime mud may be added to and mixed with the strong black liquor before passing the same through the drier, and another portion of lime mud may be added to the cycle between the drying and the subsequent heat treatment operations. In either case, the calcium carbonate will be converted to a large extent into calcium oxide, while organic compounds present will be decomposed and will assist in creating and maintaining the desired reducing condition.

The drying operation can be carried out in any suitable type of dryer, for example, a rotary furnace such as is commonly used in soda pulp mills or sulfate pulp mills for the production of black ash, either a green ash or a well burned ash. But when the material is to be destructively distilled in whole or in part and the resulting gases cooled to condense volatile organic liquids and thus recover these materials, it is preferable to avoid obtaining a well burned ash, and rather to keep the organic compounds present as such in the green ash, as these will be given a higher temperature treatment in a subsequent step from which these volatile liquids may be obtained. Another desirable type of dryer is that of the multiple hearth roaster, such as the well-known Wedge furnace and the Herreshoff furnace, the mixture of highly concentrated residual liquor and the lime mud entering at the top and being progressively dried while it descends from one hearth to another. With such equipment which is advantageously heated by the hot gases obtained from the subsequent furnace operation, using the gases as such or after being burned by addition of more air, the material may be obtained in a substantially dry form with little if any decomposition of organic compounds having occurred. This is of special advantage when the products of destructive distillation are to be condensed so far as feasible for the recovery of volatile liquids, and the product is obtained of a very uniform character which is of advantage in the succeeding steps of the process. Any other suitable type of dryer may be used.

The heat treatment step of the process, in which calcium carbonate is decomposed under reducing conditions to form calcium oxide, can advantageously be carried out in a special type of burner, for example, such a machine as the well-known Dwight-Lloyd sintering machine which is commonly used for sintering ores. Such furnaces or machines have a travelling grate and are operated with a down draft with suction boxes arranged below the travelling grate for causing the down draft. When using such a furnace or machine, the mixture of calcium carbonate and of the sodium-organic compounds in a substantially dry form, but carrying sufficient moisture to properly form the material on the moving grate, is evenly spread over the grate, and moves forward in a continuous heavy sheet, which is then ignited by means of a pilot flame, and air, which may be preheated if desired or found necessary, is drawn downward through the mass, consuming the carbonaceous fuel constituents to a greater or less extent, and driving out gases from the mixture. In case the material itself contains insufficient fuel value, as where some of the fuel value has been consumed during the drying operation, additional fuel can be supplied, and, for the purpose, some of the combustible gas formed in the process may be burned above the grate under a super-imposed hood lined with suitable material which allows the heat to be reflected down upon the material on the grate, and either without or with the products of combustion passing downwardly through the material on the grate.

In order to protect the grates against the action of certain compounds contained in the material placed thereon, there may be placed on the grates, prior to adding the material which contains the soda compounds, a thin layer of calcium carbonate, which may advantageously be the finely divided or crushed and screened limestone (preferably of high lime and low silica and iron content) which is used for making up for losses or replacements of lime mud. The mixture which contains the soda compounds may then be placed upon this first layer of limestone and the treatment carried out accordingly. This method of placing the material on the grates assists in keeping the soda compounds from running down into the openings of the grates and it serves to reduce the contact between the soda compounds and the iron grates, and facilitates discharging the finished material from the grates, and at the same time it serves to form more calcium oxide and by its cooling action in absorbing heat from the gases passing through it, the iron grates are subjected to a lesser temperature than otherwise.

Where the fusing point of the soda compounds is relatively low as compared with the temperature at which calcium carbonate readily decomposes, e. g. where sodium carbonate and sodium sulfid are present, this fusing action tends to seal over and shut off the air. By having a considerable amount of calcium carbonate intimately mixed with the soda and carbonaceous materials, the gas which is given off from the calcium carbonate tends to keep the mass porous so that the air can be drawn through. The carbon dioxide liberated comes into intimate contact with highly heated carbon and is converted to a considerable extent into carbon monoxide. These endothermic reactions are taken advantage of to aid in preventing excessive temperatures on the grates. By suitably proportioning the endothermic reactions to the exothermic reactions, the temperature can more readily be kept within the required bounds. If the temperature becomes too high, a larger amount of calcium carbonate can be mixed with the sodium-organic material, the air suction can be reduced so as to pass less air in unit time, and the rate of travel of the moving grates can be changed.

It is desirable that suitable control means be provided so that a sufficient temperature may be obtained and maintained for a sufficient length of time in order to effect the decomposition of the calcium carbonate to produce calcium oxide, and at the same time to prevent the temperature rising to such a high point that excessive fusion occurs or that an excessive loss of soda results. By using the endothermic reactions of decomposition of calcium carbonate, a considerable degree of control is readily obtained. Further endothermic reactions may be taken advantage of, where required, in order to obtain more control. For example, the conversion of the carbon dioxide from the calcium carbonate into carbon monoxide, at least in part, will remove carbon from the material and at the same time have a cooling effect. Also steam may be caused to pass through the mass and be therein decomposed into carbon monoxide and hydrogen, the degree of conversion depending upon the conditions; and more carbon dioxide may be used, where desired, by using some gases which contain carbon dioxide for example, flue gases which contain a fairly high percentage of carbon dioxide. These different materials may be used together or separately as may be found necessary for controlling the temperature. The steam may be added at such points as required in such manner that the steam is drawn downward through the mass, and the same applies to $CO_2$ gas added for this purpose. Showers of water, finely sprayed above the heated mass also can be resorted to, the water being converted into steam and the steam undergoing some decomposition. The decomposition of either steam or carbon dioxide, or both, results in a cooling effect to control the temperature of the mass and forms some more combustible material in the gases. And this form of heat energy can be utilized in another portion of the operations, as indicated above.

Where the calcium carbonate is not sufficiently decomposed by the time the majority of the carbon and other fuels of the mass have been consumed, or where the temperature is too low from this or other causes, additional fuel can be burned above the mass (or may even be added to the mass e. g. by placing saw dust or other suitable fuel therein or thereon) and the temperature raised to the desired point. Thus a hood may be placed over the moving grates and this hood lined with suitable fire-resistant lining, and oil or gas burned under the hood thus permitting the heat to be reflected down on to the mass. The hot products of combustion may be drawn through the mass, if desired, and thus more effectively add their heat to the material at this point.

During the first part of the furnacing operation, the organic compounds decompose and considerable destructive distillation occurs. The gases thus given off in the early portion of the treatment may, if desired, be kept separate from the gases later formed from the material on the grates, and can be passed through suitable cooling devices to condense contained volatile organic liquids which can be thus separated from the gases. The cooled, or non-cooled gases when cooling is not done, gases may be used for their fuel value. For example, they may be used to aid in the drying treatment referred to; or they may be burned in internal combustion engines and produce power when they have sufficient calorific value for such purpose, and this value is more easily obtained by keeping the gases which first come off separate from those which are later driven off from the material. Carbon monoxide formed from carbon and carbon dioxide also increases this calorific value.

Some of the gases, especially those which come from the latter part of the treating step and which are highly heated and may not require cooling to recover products of destructive distillation, may be used either in the drying step or may even be used to heat water or to generate steam, and this steam may be used in multiple-effect evaporators in which the preliminary evaporation of the black liquor occurs.

Where a multiple hearth furnace, such as the Wedge or the Herreshoff furnaces referred to, is utilized for the drying operation, the hot gases from the burning step of the process may be passed over the hearths in succession and thus dry the liquor, etc. as it passes countercurrent to the hot gases. In this manner advantage is taken of the heat units in the gases in a particularly advantageous manner. The material may thus be obtained in a substantially uniform manner, ready to be placed on the moving grates of the burning furnace. Strong black liquor may be mixed with the lime mud in proportion to the soda which is to be causticized, and when desired a portion of the dried material may be added thereto so that a uniform mixture of strong black liquor, lime mud and material which has previously been dried, can be fed into the drying furnace, using some of the previously dried material to act as a "sponge" and assist in the preparation of the feed to the dryer. The other portion of the dried material goes to the burning furnace.

Where the residual liquor contains oxy-sulfur compounds, these will be subjected to reduction during the heat treating operation by which the calcium carbonate is converted to calcium oxide, and such oxy-sulfur compounds, when present, or when added, will undergo an endothermic reaction of which advantage can be taken in the control of the temperatures in the burning mass. These oxy-sulfur compounds may be sodium sulfate, or sodium sulfo-organic and other compounds contained in residual liquor which is formed when wood, etc. is cooked with cooking liquors which contain a sulfite of sodium, especially those which contain substantial amounts of sodium sulfite. Such additions may be made as will maintain the desired sodium sulfid content in the regenerated cooking liquor, thus supplying additions of soda and of sulfur, and these additions can be so regulated as may be required.

Where residual liquors resulting from cooking wood with the ordinary acid sulfite liquors, containing calcium base, are added to the cycle of the present process, fuel, sulfur and additional lime compounds will be obtained therefrom. This residual liquor may be used for supplying additional lime, to make up for losses or rejections, an also supply sulfur and fuel. The organic contents may be likewise destructively distilled and the carbon consumed.

Where a considerable amount of sodium sulfid is desired in the regenerated cooking liquor, reducing conditions should be maintained throughout the furnacing operations, for example, by maintaining a moderate amount of carbon in the furnace product up to the time when it is discharged from the furnace. By reducing the amount of carbon thus present, and passing more air through the mass while hot, the regenerated cooking liquor may have a moderate amount of sodium sulfite or other oxy-sulfur compound or compounds. That is, the reducing operations can be followed by an oxidizing operation, and the degree of reduction and of oxidation may be controlled to give the sulfur compounds largely in the form of sulfid or in the form of oxy-sulfur compounds.

Instead of using a multiple hearth dryer followed by a moving grate type of sintering machine, a single machine may be used with certain advantages. This may be a multiple hearth machine, such as referred to above, and the mixture of lime mud and strong black liquor, containing only a moderate amount of water, can be fed onto the upper hearth. It may be mixed with some of the dried or partially dried material to act as a "sponge" in order to improve its physical condition. The material as it is moved along by the revolving rakes and passed downward from hearth to hearth, comes into contact, countercurrent, with the hot gases introduced at a lower point. These hot gases may be obtained from any suitable fuel, preferably free from silica, and may be formed from the product itself, by introducing air into the lower end of the furnace and burning the fuel of the product after it has dried to the point at which combustion will occur.

The amount of air thus introduced is under good control, and the degree of reduction can be controlled. Additional fuel may be introduced between the top and the bottom so that the material is first dried, then decomposed, fuel being burned therein for this purpose, and finally the material be passed in contact with air which will serve to cool the material before it is discharged and also serve to effect some oxidation. This is of particular advantage when some oxy-sulfur compounds are desired in the regenerated cooking liquor. The use of the mixture of lime mud and black liquor works better than black liquor alone as the calcium carbonate improves the physical condition of the material. Care should be taken to control the temperatures as by the use of endothermic reactions or by other means, so that excessive temperatures are avoided or are so modified as to be under control.

The simultaneous treatment of the lime mud and the strong residual liquor can be effected in various ways and still make use of the fuel value of the liquor to decompose the sodium organic compounds and also the calcium carbonate for the purposes and objects described above. Use can also be made of the endothermic reactions which have been featured herein. For example, the strong residual liquor and the lime mud, carrying only a moderate amount of water, can be thoroughly mixed and kept so and then sprayed or blown into a suitable furnace which is highly heated, the material being atomized so that combustion takes place. The amount of lime mud which can be thus used in admixture with residual liquor will depend upon the conditions.

Where a high temperature is reached, i. e. greater than necessary to maintain the combustion and difficulty is had in maintaining furnace linings, considerable lime mud can be mixed with the strong residual liquor, and the amount of lime mud so added can be increased up to a point at which safe operation is maintained. The cooling effect due to the decomposition of the calcium carbonate aids in keeping the flame temperature down and thus prolongs the life of the furnace. The calcium carbonate is readily decomposed since it is in a finely divided condition and is in intimate contact with the hot flame. The use of lime mud in this manner has other advantages, among which may be mentioned the assistance in recovering the soda from the gases. With this method of burning, practically all of the carbon can ultimately be consumed and the regenerated liquor can be more readily clarified.

Instead of making steam from utilization of the hot gases from the furnace in which the mixture of black liquor and lime mud is decomposed as stated, these hot gases may be passed through a rotary lime kiln and therein used for burning calcium carbonate to form calcium oxide. The material used may be either lime mud alone, or it may be a mixture of lime mud and strong residual liquor. Thus a portion of the liquor may be burned by spraying or otherwise atomizing it into a heated furnace, and another portion mixed with lime mud and this mixture treated in a rotary lime kiln or other suitable furnace, making use of the hot gases resulting from the burning of the carbonaceous material of the liquor. This lime kiln acts to collect some of the soda blown out of the highly heated furnace. All of the lime mud may be treated in the rotary or some of it may be mixed with the black liquor which goes into the highly heated furnace. The lime mud may enter the rotary lime kiln alone or may be previously mixed with some liquor.

Instead of burning the concentrated and dried liquor, in whole or in part, by the spraying method, the lime mud and liquor may be mixed together and passed through a dryer e. g. an ordinary rotary furnace such as referred to above, and therein both dried and subsequently heated to effect the conversion of calcium carbonate to calcium oxide, so that the product discharged from the rotary furnace contains both calcium oxide and sodium carbonate. Or, the rotary furnace may be used only for the drying of the material, to make it into a green ash, and this material may then be discharged from this dryer and reintroduced into another similar furnace and therein burned to decompose remaining sodium organic compounds and to convert the calcium carbonate into the oxide, leaving some carbon with the mixture when burned. The hot gases from the burning furnace are utilized in the drying furnace. This use of two furnaces in series, one called the dryer and the other called the burner, permits the ready handling of the material in such furnaces. The material after being first dried has considerable fuel value and, with this arrangement, little if any additional fuel is required.

Any suitable kind of dryer may be used, which may be either a rotary furnace of sufficient length and proper diameter to efficiently dry the mixture of lime mud and strong liquor, or it may be a furnace having multiple hearths and revolving rakes, or any other suitable drying furnace may be used. The dried or nearly dried material, preferably containing a considerable amount of the original sodium organic compounds, is capable of generating a considerable amount of heat in the burner. It may be sufficient in amount so that additional fuel is not required, although additional fuel, preferably free from silica, may be used where required to decompose the carbonate of calcium and to decompose the sodium organic compounds and to reduce any oxy-sulfur compounds to the desired degree.

In the use of the sintering type of furnace having the traveling grates, or even with the multiple hearth furnace, it is desirable to have the material fairly porous. In order to insure such degree of porosity as is most desirable, sawdust which is fairly coarse may be mixed with the liquor and the lime mud, and this sawdust upon carbonization will aid in the operation partly by increasing the porosity and partly by the additional heat energy supplied. Where products of distillation are recovered by cooling the gases to condense liquids, such use of sawdust serves to increase the amount of such recovered material, and this method of utilizing the sawdust is one which can be advantageously combined with the treatment of the lime mud and the liquor.

With the use of a continuous settler and clarifier for the causticized liquor, the thick lime mud at the bottom may be moved continuously or intermittently and mixed with strong residual liquor and sent directly to the furnace. Or the lime mud may be previously washed, e. g. on a filter, the thickened and washed or partially washed lime mud being later mixed with strong liquor, and the washings being used in the formation of the cooking liquors. By avoiding the use of the filtering step certain advantages are effected.

It will thus be seen that the present invention provides an improved process for the treatment of residual liquors from the cooking of wood whereby the liquors after concentrating and drying are subjected to a reducing furnace treatment, and whereby calcium carbonate is admixed with the liquors before the reducing furnace treatment and is converted into calcium oxide during the furnace treatment, so that a self-causticizing furnace product is produced, containing sodium carbonate and lime and also containing sulfur compounds. It will further be seen that this furnace product is added directly to water and agitated therewith at an elevated temperature with the resulting causticizing of the sodium carbonate by the lime to form caustic soda so that a cooking liquor, or a liquor suitable for use in making a cooking liquor, is directly obtained, containing caustic soda and also containing sodium-sulfur compounds.

It will further be seen that the drying step of the process can be carried out in different ways, even separate from or combined with the subsequent furnace operation; while the furnace operation is carried out under reducing conditions and at a temperature sufficient for the conversion of calcium carbonate to calcium oxide. It will further be noted that the process has various advantages and can be carried out with various modifications.

We claim:—

1. The method of treating residual liquor from the cooking of wood with a cooking liquor containing caustic soda and a sodium-sulfur compound which comprises heating the dried residual liquor in admixture with calcium carbonate under chemically reducing conditions at a temperature sufficient to convert calcium carbonate into calcium oxide, and admixing the resulting product with water and agitating the same at an elevated temperature to produce a solution containing caustic soda and sodium-sulfur compounds.

2. The method of treating residual liquor from the cooking of wood with a cooking liquor containing caustic soda and a sodium-sulfur compound which comprises heating the dried residual liquor in admixture with calcium carbonate under chemically reducing conditions at a temperature sufficient to convert calcium carbonate into calcium oxide.

3. The method of treating residual liquor from the cooking of wood with a cooking liquor containing caustic soda and a sodium-sulfur compound which comprises adding calcium carbonate to concentrated residual liquor, subjecting the resulting mixture to a drying operation, and subjecting the dried mixture to a chemically reducing treatment at a temperature sufficient to convert calcium carbonate into calcium oxide.

4. The method of treating residual liquor from the cooking of wood with a cooking liquor containing caustic soda and a sodium-sulfur compound which comprises adding calcium carbonate to concentrated residual liquor, subjecting the resulting mixture to a drying operation, and subjecting the dried mixture to a chemically reducing treatment at a temperature sufficient to convert calcium carbonate into calcium oxide, adding the resulting product to water and agitating the same therewith at an elevated temperature to give a solution containing caustic soda and sodium-sulfur compounds.

5. The method of treating residual liquor from the cooking of wood with a cooking liquor containing caustic soda and a sodium-sulfur compound which comprises heating the dried residual liquor in admixture with calcium carbonate under chemically reducing conditions at a temperature sufficient to convert calcium carbonate into calcium oxide, the heating operation being carried out on a traveling grate and with a down draft through the material.

6. The method of treating residual liquor from the cooking of wood with a cooking liquor containing caustic soda and a sodium-sulfur compound which comprises adding precipitated calcium carbonate to concentrated residual liquor, subjecting the resulting mixture to a drying operation, and subjecting the dried mixture to a chemically reducing treatment at a temperature sufficient to convert calcium carbonate into calcium oxide, the drying operation being carried out in a multiple hearth drier through which the material is caused to pass in a progressive and continuous manner.

7. The method of treating residual liquor from the cooking of wood with a cooking liquor containing caustic soda and a sodium-sulfur compound which comprises heating the dried residual liquor in admixture with calcium carbonate under chemically reducing conditions at a temperature sufficient to convert calcium carbonate into calcium oxide, the heating being carried out on a continuous moving grate and a layer of calcium carbonate being interposed between the grate and the charge thereon.

8. The method of treating residual liquor from the cooking of wood with a cooking liquor containing caustic soda and a sodium-sulfur compound which comprises adding precipitated calcium carbonate to concentrated residual liquor, subjecting the resulting mixture to a drying operation, and subjecting the dried mixture to a chemically reducing treatment at a temperature sufficient to convert calcium carbonate into calcium oxide, the hot gases from the last mentioned operation being employed in the previous drying operation.

9. The method of treating residual liquor from the cooking of wood with a cooking liquor containing caustic soda and a sodium-sulfur compound which comprises adding precipitated calcium carbonate to concentrated residual liquor, subjecting the resulting mixture to a drying operation, and subjecting the dried mixture to a chemically reducing treatment at a temperature sufficient to convert calcium carbonate into calcium oxide, the drying operation being promoted by admixture of previously dried material with the concentrated residual liquor and calcium carbonate before the drying operation.

10. The method of treating residual liquor from the cooking of wood with a cooking liquor containing caustic soda and a sodium-sulfur compound which comprises heating the dried residual liquor in admixture with calcium carbonate under chemically reducing conditions at a temperature sufficient to convert calcium carbonate into calcium oxide, the heating operation being carried out in stages with destructive distillation during the preliminary stage and the gases formed by the destructive distillation being separately collected for the recovery of valuable products therefrom.

11. The cyclic or regenerative process of pulp manufacture which comprises cooking wood with a cooking liquor containing caustic soda and a sodium-sulfur compound, concentrating and drying the residual liquor, heating the dried residual liquor in admixture with precipitated calcium carbonate under chemically reducing conditions at a temperature sufficient to convert calcium carbonate into calcium oxide and to form sodium carbonate, adding the resulting product to water and agitating the same at an elevated temperature to give a cooking liquor containing caustic soda and sodium-sulfur compound, and carrying out the further cooking operation with such liquor.

12. The method of treating residual liquor from the cooking of wood with a cooking liquor containing caustic soda and a sodium-sulfur compound which comprises adding calcium carbonate to concentrated residual liquor, subjecting the resulting mixture to a drying operation, and subjecting the dried mixture to a chemically reducing treatment at a temperature sufficient to convert calcium carbonate into calcium oxide, the drying and subsequent heating operation being carried out so as to effect destructive distillation of organic matter before the final furnacing operation and separately collecting the gaseous products of the destructive distillation and recovering valuable constituents therefrom.

13. The method of treating residual liquor from the cooking of wood with a liquor containing a sodium sulfur compound which comprises mixing calcium carbonate with constituents of the residual liquor, subjecting the mixture to a treatment adapted to convert calcium carbonate into calcium oxide and to convert sodium compounds into sodium carbonate and sodium sulfid, mixing the resulting product with water under conditions adapted to produce caustic soda and precipitate calcium carbonate, recovering a solution containing caustic soda and sodium sulfid and utilizing such solution for cooking of wood.

14. The method of supplying lime, sulfur and fuel to the cycle defined in claim 13, which comprises adding to the mixture of sodium compounds and calcium carbonate constituents of a residual liquor from a calcium bisulfite cooking process.

15. The method according to claim 13 in which the precipitated calcium carbonate from the causticizing step is utilized by mixing with constituents of residual liquor and the mixture treated as described in said claim 13.

In testimony whereof we affix our signatures.

LINN BRADLEY.
EDWARD P. McKEEFE.